United States Patent [19]

Calltharp et al.

[11] Patent Number: 4,775,467

[45] Date of Patent: * Oct. 4, 1988

[54] REACTOR PIPING WITH PUMP COLUMN

[76] Inventors: Glen R. Calltharp, 16006 Beckett Ln., Olathe, Kans. 66062; Kenneth L. Norcross, III, 1240 W. 70th Ter., Shawnee Mission, Kans. 66208; Dennis L. Nelson, 147 S. Normandy Dr., Olathe, Kans. 66061

[*] Notice: The portion of the term of this patent subsequent to Feb. 22, 2004 has been disclaimed.

[21] Appl. No.: 127,949

[22] Filed: Dec. 1, 1987

Related U.S. Application Data

[63] Continuation-in-part of Ser. No. 17,563, Feb. 24, 1987, Pat. No. 4,711,716, which is a continuation-in-part of Ser. No. 778,550, Sep. 20, 1985, Pat. No. 4,645,592.

[51] Int. Cl.[4] .............................................. B01D 45/02
[52] U.S. Cl. ................................. 210/142; 210/221.2; 210/525; 210/527; 210/532.2; 210/533
[58] Field of Search ............ 210/192, 525, 527, 532.1, 210/532.2, 533, 535, 537, 538, 241, 242.1, 242.2, 221.2, 221.1, 108, 198.1, 220, 333.01, 416.1, 393, 425–427

[56] References Cited

U.S. PATENT DOCUMENTS 3,054,602 9/1962 Proudman .
3,293,861 12/1966 Hinde .
3,956,124 5/1976 Fast et al. .
4,022,696 5/1977 Krofta .
4,043,912 8/1977 Bascope et al. .
4,059,531 11/1977 Tardivel .
4,645,592 2/1987 Calltharp et al. ................. 210/525

Primary Examiner—Frank Sever
Attorney, Agent, or Firm—Litman, McMahon & Brown

[57] ABSTRACT

A piping and flow control system for a wastewater reactor having a reaction vessel includes an influent distribution and sludge withdrawal conduit located near the bottom of the reactor, an aeration device located within the reactor, a treated effluent decanting system and an automatic control mechanism including a liquid level sensor. The influent distribution and sludge withdrawal conduit along with the aeration device are selectively flow connected with a pumping mechanism by a piping manifold which is also selectively connected to a source for influent wastewater to be treated by the reactor and sludge disposal. The pumping mechanism is located in a pump column within the vessel. The manifold includes a series of control valves which may be selectively opened or closed to allow a single pumping mechanism; to input wastewater near the bottom of the reactor; or to withdraw concentrated sludge from the bottom of the reactor and dispose of the sludge to another location; or to withdraw fluid from the reactor through the influent distribution and sludge withdrawal conduit during agitation of the reactor and to inject the fluid into the aeration device with or without new wastewater; or to draw fluid backwards through the aeration device so as to clean nozzles or outlets associated therewith and to return the fluid to the reactor.

15 Claims, 5 Drawing Sheets

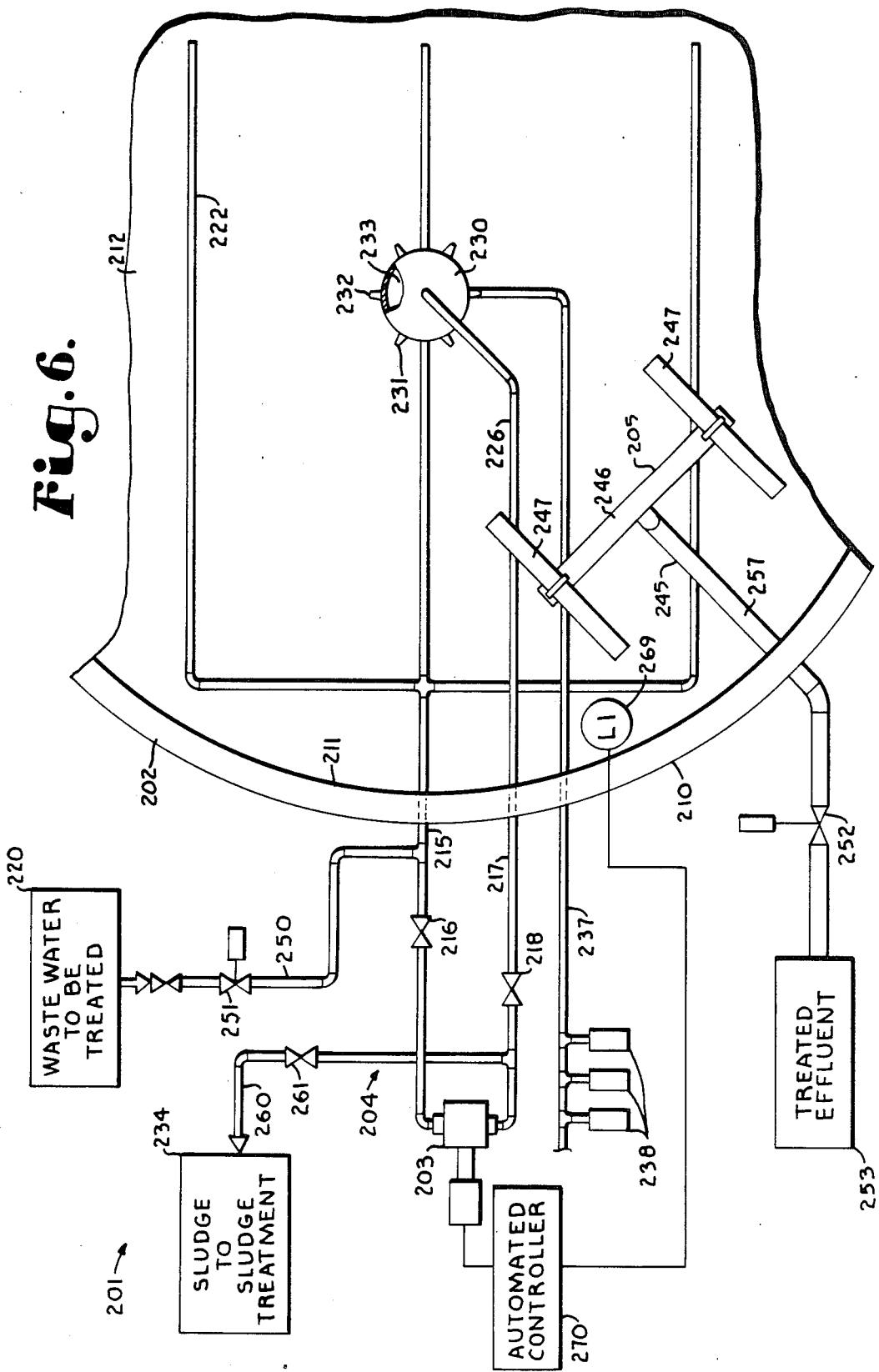

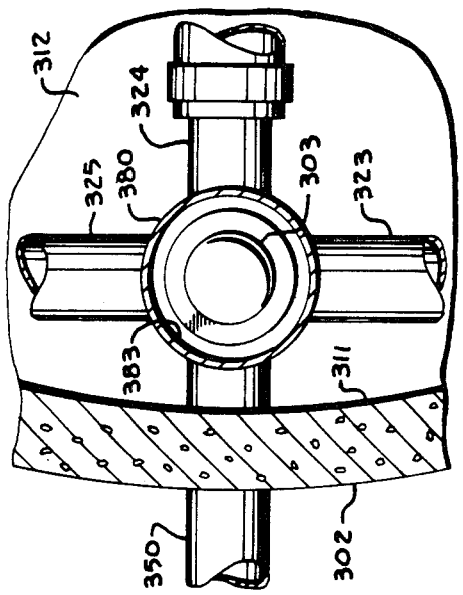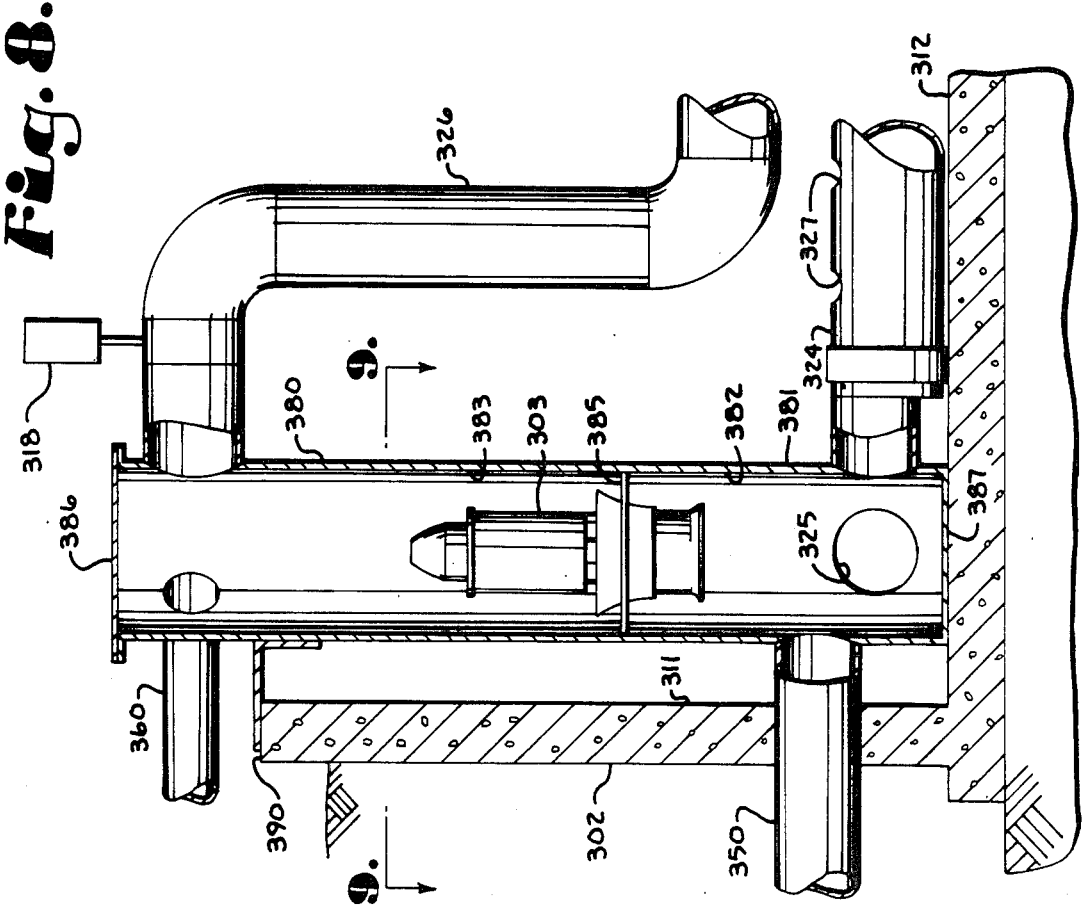

REACTOR PIPING WITH PUMP COLUMN

CROSS-REFERENCE TO RELATED APPLICATION

The present application is a continuation-in-part of U.S. Ser. No. 017,563, filed Feb. 24, 1987, now U.S. Pat. No. 4,711,716, issued 12-8-87, which was a continuation-in-part of U.S. Ser. No. 778,550, filed Sept. 20, 1985, now U.S. Pat. No. 4,645,592, issued Feb. 24, 1987.

BACKGROUND OF THE INVENTION

The present invention relates to processing equipment for utilization in reactors for treatment of wastewater with microorganisms to remove impurities and, in particular, to sequencing batch reactors.

In the early history of wastewater treatment by microorganisms, the wastewater was often batched and treated by various processes of agitation, aeration or the like. With the amount of wastewater to be treated increasing in volume and in impurities, batch treatment became fairly labor intensive and was eventually substantially replaced by continuous wastewater treatment processes in the 1920's and 1930's.

However, with the relatively recent innovation of computers which can be programmed to control valves, motors, etc. in the wastewater treatment process system, batch reactors again appear to be a viable alternative and offer attractive advantages over continuous processes.

In particular, batch reactors have certain control and economic advantages over continuous reactors, especially where the control can be accomplished by as many or fewer manhours as are required to run like quantity and quality continuous reactors. Sequencing batch reactors which retain a certain amount of sludge within the reactor, fill, aerate and/or agitate, settle, decant, and remove excess sludge, have been shown to be highly effective in treatment of wastewater. As is described in greater detail below, sequencing and timing of the various steps in the wastewater treatment can be varied somewhat to take advantage of particular conditions to achieve different treatment objectives such as treatment of different types of pollutants and the ability to process even with relatively variable flow patterns without substantial loss of effluent quality.

A reactor utilizing jet aerators provides advantages, since this type of aerator may be utilized to agitate and/or aerate without substantial modification to the apparatus. However, the relatively small nozzles of jet aerators have, in the past, presented problems in the industry, since they are highly susceptible to blockage by debris in the wastewater. Some previous attempts to utilize jets have developed systems that require removing the equipment with jets attached from the reactor so the jets can be cleaned which is very labor intensive and time consuming. Other users of jet nozzles have used cleaning methods utilizing air lift principles which resulted in a relatively very weak cleaning effect at the nozzle.

As noted above, for sequencing batch reactors to be most economic, it is important to reduce the manhours necessary to operate the reactor. This may be accomplished by automating as much of the process as possible, in particular, substantially or completely controlling the process by means of a programmable computer or the like. In such a controlled process, it is also important to efficiently handle a wide range of flow rates into the process without significant degradation in the quality of the effluent. In such a controlled process, it is further important to minimize energy requirements and sludge production.

In wastewater treatment reactors, it is also desirable to reduce the number of pumps in order to keep capital costs at a minimum, to reduce the chance of failure of equipment, reduce maintenance requirements and to simplify the process in general. However, it is necessary to allow fresh wastewater to be treated to flow into the reactor, to withdraw excess sludge from the reactor, to circulate fluid within the reactor through an agitation-/aeration system and to be able to backflush through the agitator/aeration system to clean nozzles associated therewith so as to restore full operation thereof when the nozzles become plugged with debris suspended in the wastewater. In addition, the treated wastewater and excess residual sludge must be removed from the reactor.

Each of the fluid handling steps noted above, including nozzle cleanout, potentially requires a pumping mechanism or must rely on another fluid driving force such as gravity to accomplish the desired goal. For the reasons discussed above, it is desirable that the system be designed such that all of these steps may be accomplished by as few pumping mechanisms as possible, preferably a single unit.

During some alternative treatment processes utilized in sequencing batch reactors for treating specific problem pollutants or during periods of high influent flow rates, such as during heavy rainfalls, it may be desirable to inject wastewater into the reactor during a settling or a decanting operation, so that decanting and filling steps can occur simultaneously.

Previously, batch reactors have often been essentially long narrow tanks with baffles to allow influent velocity dissipation at the baffled end, and effluent decanting at the opposite end. Long narrow, baffled tanks involve higher capital costs, require more land area, and generally impose an undesirable constriction on design options. A fixed baffle is sometimes used in such installations to dissipate influent velocities, but such a baffle reduces flexibility in control over the conditions which allow microorganism selection. Selective microorganism production helps ensure successful operation and is one of the batch reactors primary advantages.

In order that the incoming influent not disrupt the treated effluent in a reactor vessel of any geometry, the influent should preferably be distributed at multiple locations across the bottom of the reactor to dissipate flow velocity of influent as much as possible and to reduce agitation. Likewise, it is important that sludge be removed in a similar manner so that the heaviest concentrations of sludge at the bottom of the reactor are removed first and preferably so the fluid to be removed does not draw from the upper portions of the reactor, but rather from those lower areas having a high concentration of sludge. High sludge concentrations reduce sludge treatment costs. In many prior art systems, sludge is withdrawn by point type takeoff devices, such that the sludge often becomes diluted by upper layers of fluid entrained with the takeoff fluid due to flow velocity and lack of multiple spaced withdrawal points, with the result that the sludge is relatively less dense in solids and costs more to process in such systems.

In reactors of this type, it is also important that the decanted fluid be able to be removed with as little contamination from the sludge as possible. Therefore, it is desirable that the influent distributing manifold be relatively close to the bottom of the reactor to dissipate velocity of influent, so that influent can, under certain conditions, be added to the reactor as decanted fluid is removed without agitation or contaminating the decanted fluid. It is also desirable that the decanting system draw from near the top of the reactor, slightly beneath the upper layer of fluid so that floating debris is not withdrawn with the decanted fluid. Preferably, the decanting withdrawal system will draw from a relatively fixed distance beneath the upper surface of the reactor throughout the decanting cycle.

OBJECT OF THE INVENTION

Therefore, the objects of the present invention are to provide a wastewater batch treatment reactor adaptable to various treatment processes within the reactor; to provide such a reactor having a piping and flow control system which allows for a minimization of pumping mechanisms yet allows automated control of the process; to provide such a system wherein a single pump is connected by a manifold to an influent distribution and sludge withdrawal conduit, to a jet aeration apparatus, and to an influent wastewater source and wherein the manifold includes selective control means to allow the pump to be utilized to selectively withdraw excess sludge from the reactor and pump same to sludge disposal, to allow fresh wastewater to be treated to flow into the reactor, to circulate fluid from within the reactor through the aeration jet during aeration processes and to backflush through the aeration jet to clean the nozzles thereof; to provide such a system wherein the pump is positioned within a pumping column within the reactor so as to simplify piping and valving and so as to reduce the number of pipe openings required in the side wall of the reactor; to provide such a system having a decanting apparatus suitable for removing treated fluid from the reactor with a minimization of contamination by sludge; to provide such a reactor requiring relatively little piping, few valves and a minimum of pumps, yet which may be computer controlled; to provide an influent flow distribution and sludge withdrawal system which allows influent wastewater to be distributed over a substantial lower portion of the reactor at numerous spaced locations simultaneously and at dissipated low flow velocities and further to likewise allow withdrawal of treated effluent and/or withdrawal of excess sludge from multiple points across the bottom of the reactor such that the withdrawn treated effluent is relatively very low in sludge solids and the withdrawn sludge is very high in solids; to provide such a system which is easily adaptable to be wholly or partially automated, in particular, adapted to computer control; to provide such a system which requires few manhours to operate and maintain; to provide such a system which is relatively inexpensive to build, relatively inexpensive to operate and has a long life expectancy.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a partially schematic and fragmentary top plan view of a modified facility showing a piping and flow control system thereof.

FIG. 8 is an enlargd and fragmentary side elevational view of the second modified facility showing a pump column and part of the associated piping system thereof, with portions broken away to show detail.

FIG. 9 is an enlarged and fragmentary cross-sectional view of the second modified facility, taken along line 9—9 of FIG. 8.

DETAILED DESCRIPTION OF THE INVENTION

Figure 1:
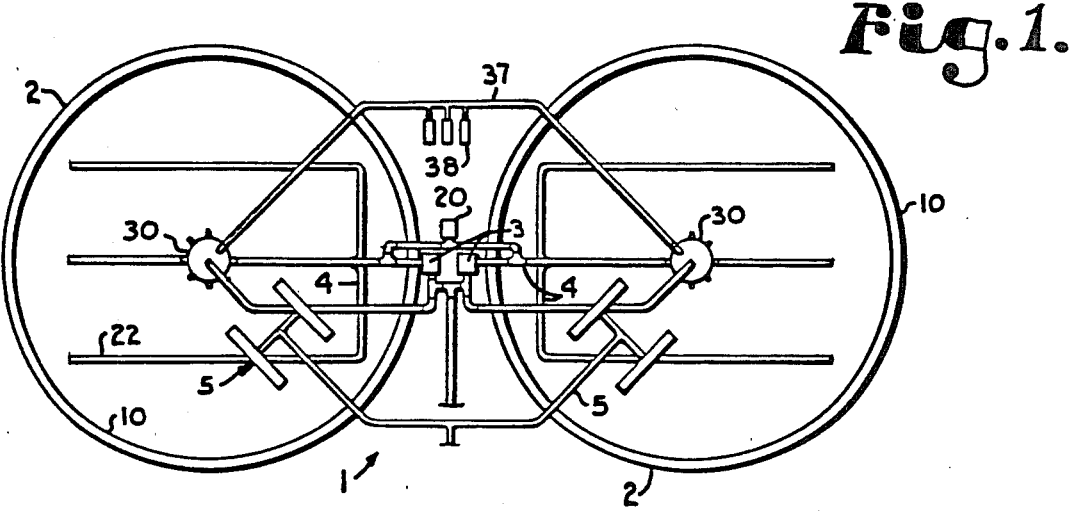
FIG. 1 is a partially schematic top plan view of a wastewater treatment facility showing a pair of wastewater treatment reactors each having a piping and flow control system according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a wastewater treatment facility including a pair of reactors 2 for treatment of wastewater with microorganisms and aeration, pumping means such as a recirculation pump 3 with an associated manifold 4, and a decanting apparatus 5.

Figure 2:
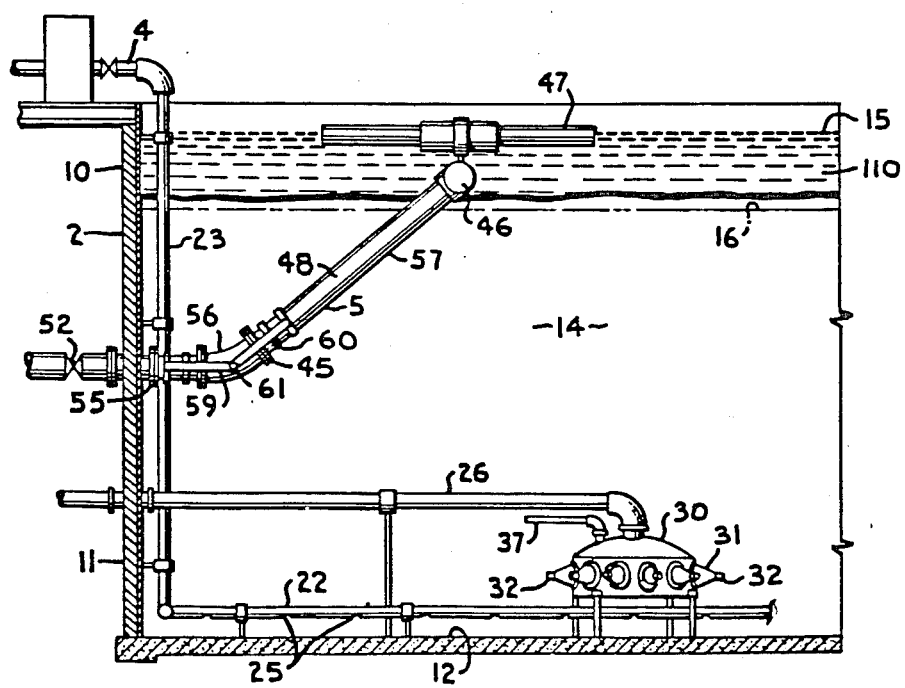
FIG. 2 is an enlarged and partially schematic crosssectional view of one of the wastewater treatment reactors, showing an influent distribution and sludge withdrawal system, a jet aeration apparatus and a decanting apparatus associated therewith.

Each of the reactors 2 comprises a cylindrical fluid containing tank, vessel or reservoir 10 having a side wall 11 and a floor 12. Each reservoir 10 holds wastewater fluid 14 being treated therein and the fluid 14 has a cyclic level, see FIG. 2, which has a normal high mark generally indicated by the reference numeral 15 and a normal low level mark indicated by the reference numeral 16.

Wastewater to be treated enters through filling or inlet means such as the manifold 4 generally at the location indicated by the reference numeral 20 and is distributed along the bottom of the reactors 2 by means of an elongate trident-shaped distribution conduit or channel 22 flow connecting with and joined to the manifold 4 by downcomer/riser 23. The conduit 22 has a plurality of spaced distribution outlets or apertures 25 therealong, so that the apertures are positioned at a substantial number of different locations near the bottom of each reservoir 10.

The distribution conduit 22 also flow connects with the pump 3 through the manifold 4 and the inlet means so as to distribute flow to the pump 3 or incoming wastewater to be treated along a lower portion 28 of the reservoir 10.

The pump 3 also is flow connected by the manifold 4 to a distribution structure 30. The distribution structure 30 has an internal chamber 33 connecting with a plurality of distribution nozzles 31. The nozzles 31 are internally shaped as a truncated cone and have discharge openings or apertures 32 therein having a cross-section smaller than the rest of such nozzle.

As will be discussed in greater detail later, piping and valving of each of the pumps 3 may be selectively adjusted so that the pump 3 may draw from the distribution conduit 22 and discharge through the nozzles 31 or draw through the nozzles 31 and from the apertures 25 in the distribution conduit 22 for backflushing and cleaning of the nozzles 31, as desired. The manifold 4 associated with each pump 3 may also be flow configured as sludge removal means to discharge sludge drawn from the conduit 22 to a sludge collection location designated by the reference numeral 34, so that excess sludge may be withdrawn from the reactor 2.

A pressurized air manifold 37 is connected to a compressed air source, such as air compressors 38 and with the distribution structure 30. In this manner, compressed air can be selectively mixed with the wastewater fluid in the distribution structure 30 such that the wastewater exiting the nozzles 32 is highly oxygenated and aerated and may be moving at a relatively higher velocity to mix with and agitate the fluid 14 in the reactor 2.

Each decanting apparatus 5 comprises support means, such as supporting structure 45, a clarified liquid receiver 46, flotation means, such as floats 47, and a discharge conduit 48. The discharge conduit 48 sealably passes through an associated reactor wall 11 and empties into a municipal sewer, stream or the like, as indicated by the reference numeral 53 at the location noted as treated effluent.

The discharge conduit 48 has a control valve 52 positioned therealong vertically spaced beneath the normal range of positions for the liquid receiver 46. The valve 52 may be selectively activated to allow or prevent flow of fluid through the conduit 48. The support structure 45 is medially mounted upon the wall 11 by a flange unit 55. The flange unit 55 is connected to a flexible tube 56 which in turn is connected to a support pipe 57 which both comprises and provides structure for the conduit 48 passing therethrough. Rigid struts 59 and 60 extend from both the flange unit 55 and the support pipe 57 respectively and are pivotally joined at hinge means such as hinge 61 so that the pipe 57 may be freely articulated about the flange unit 55, especially in a vertical plane.

It is foreseen that a suitable conduit 48 between the wall 11 and the receiver 46 could incorporate flexible tubing along the entire length thereof and have one or more rigid arms being medially articulated and extending between the wall 11 and the receiver 46 to provide support for the receiver 46.

The illustrated receiver 46 is an elongate tube centrally connected to the pipe 57 and flow communicating internally therewith. The receiver 46 is generally horizontally positioned and remains horizontally aligned along its axis as the pipe 57 pivots about the flange unit 55 at the hinge 61.

Figure 5:
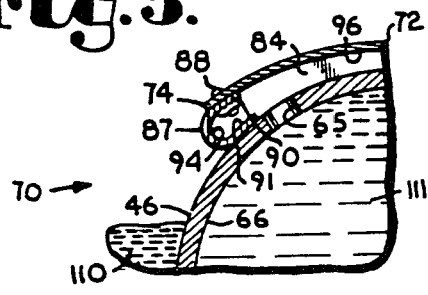
FIG. 5 is a fragmentary and enlarged cross-sectional view of the decanting apparatus, taken along line 5—5 of FIG. 3.
Figure 3:
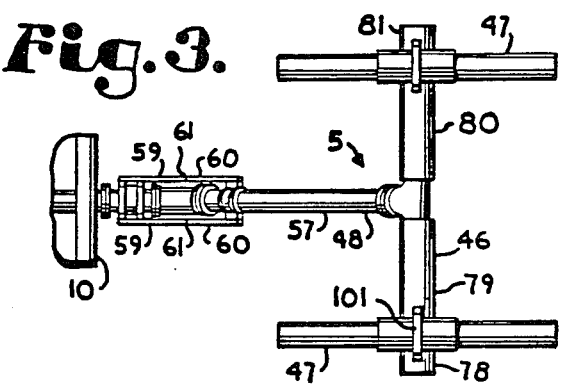
FIG. 3 is an enlarged and fragmentary top plan view of the decanting apparatus.

With reference to FIG. 5, located at spaced locations along the receiver 46 near the upper side thereof are a plurality of orifices, openings, apertures or ports 65. The ports 65 open into a central collecting chamber or cavity 66 of the receiver 46. It is foreseen that other receiver configurations such as circular or cross-shaped would function as the illustrated elongate tube receiver 46. Similarly, it is foreseen that while the illustrated apertures are round, a wide variety of shapes would function for the purpose of the present invention, for example, slots.

Flap means, such as flap mechanism 70, are attached to the receiver 46. The flap mechanism 70 includes a relatively inflexible cover plate 72, sealably attached along one side thereof to the receiver 46 and having an opposite side 74 which is spaced from the receiver 46. The cover plate 72 covers, but is spaced from the ports 65. The cover plate 72 includes four separate sections 78, 79, 80 and 81 in the illustrated embodiment and opposite ends of each section have an end plate 84 which seals between the cover plate 72 and the receiver 46.

The flap mechanism 70 also includes a flap 87 attached to the cover plate side 74 by fasteners such as rivets 88. The flap 87 is flexible and resilient in nature. Preferably, the flap 87 is segmented and generally coextensive with the unattached side 74 of each of the cover plate sections 78, 79, 80 and 81. The flap 87 has an attached side 90 and an opposite side 91 and is U-shaped or otherwise bent back upon itself such that the flap unattached side 91 is biased or urged against the receiver 46 by the resiliency of the flap 87. When the flap 87 is positioned between the cover plate 72 and the receiver 46, it is somewhat compressed to provide for the biasing effect, but not so much as to make the flap unattached side 91 unmovable. A flap 87 constructed of buna-N rubber has proved satisfactory for this purpose. However, a bend 94 in the flap 87 is necessarily loose enough to allow the flap side 91 to move away from the receiver 46 when external water pressure is exerted against one side and a partial vacuum against the opposite side so as to provide a substantial differential pressure gradient across the flap 87, as the valve 52 opens and drains the receiver 46. When the flap end 91 is against the receiver 46, the flap cover plate 72 and end plates 84 cooperate to prevent external water from entering a cavity 96 formed thereby and hence from entering the ports 65. It is foreseen that the cavity 96 may provide the function of the ports 65 so that the aperture blocked by the flap means would be the space between the receiver 46 and the cover plate 72, thereby rendering the illustrated ports unnecessary. The illustrated flap 87 is positioned and constructed so as to not provide a ledge, lip or other collection point for sludge to accummulate during mixing. In particular, the receiver 46 slopes downwardly at the location where it is engaged by the flap 87 so sludge is urged to fall to the bottom of the reactor 2 rather than collect at that location.

It is also foreseen that other types of flaps could be utilized for the purpose described, that is, to prevent flow of fluid across the opening occluded by the flap and into the clarified fluid receiver when the clarified fluid discharge is blocked or shut off such that the clarified fluid in the receiver becomes stagnant and reaches general equilibrium with the fluid outside of the receiver. On the other hand, when the drain on the receiver is open so that the clarified fluid can drain therefrom, a partial vacuum (or at least a relatively lower pressure compared to outside the receiver) may be produced within the receiver and there is a differential pressure on opposite sides of the flap created by fluid pressure exterior of the receiver and this vacuum. At this time, the flap 87 should swing about the bend 94 and open to allow clarified fluid to enter the receiver. The flap 87 is, therefore, biased to prevent fluid from entering the receiver 46 when draining is not desired and swings open to allow passage of clarified fluid into the receiver 46 when draining is desired.

Connected to the receiver 46 near opposite ends thereof are the floats 47. The illustrated floats 47 are elongate foam filled tubes which are connected near their center to the receiver 46 by swivel connectors 101. The floats 47 are allowed to pivot or swivel freely relative to the receivers 46 upon the swivel connectors 101 such that the floats 47 may remain relatively horizontally aligned on the fluid surface. The floats 47 are vertically spaced above the receiver 46 and, generally, the floats 47 remain close to or at the upper fluid level 15 in the reactor 2 whereas the receiver 46 remains spaced somewhat below the upper fluid level 15 to prevent scum and floating debris from entering the ports 65.

Figure 4:
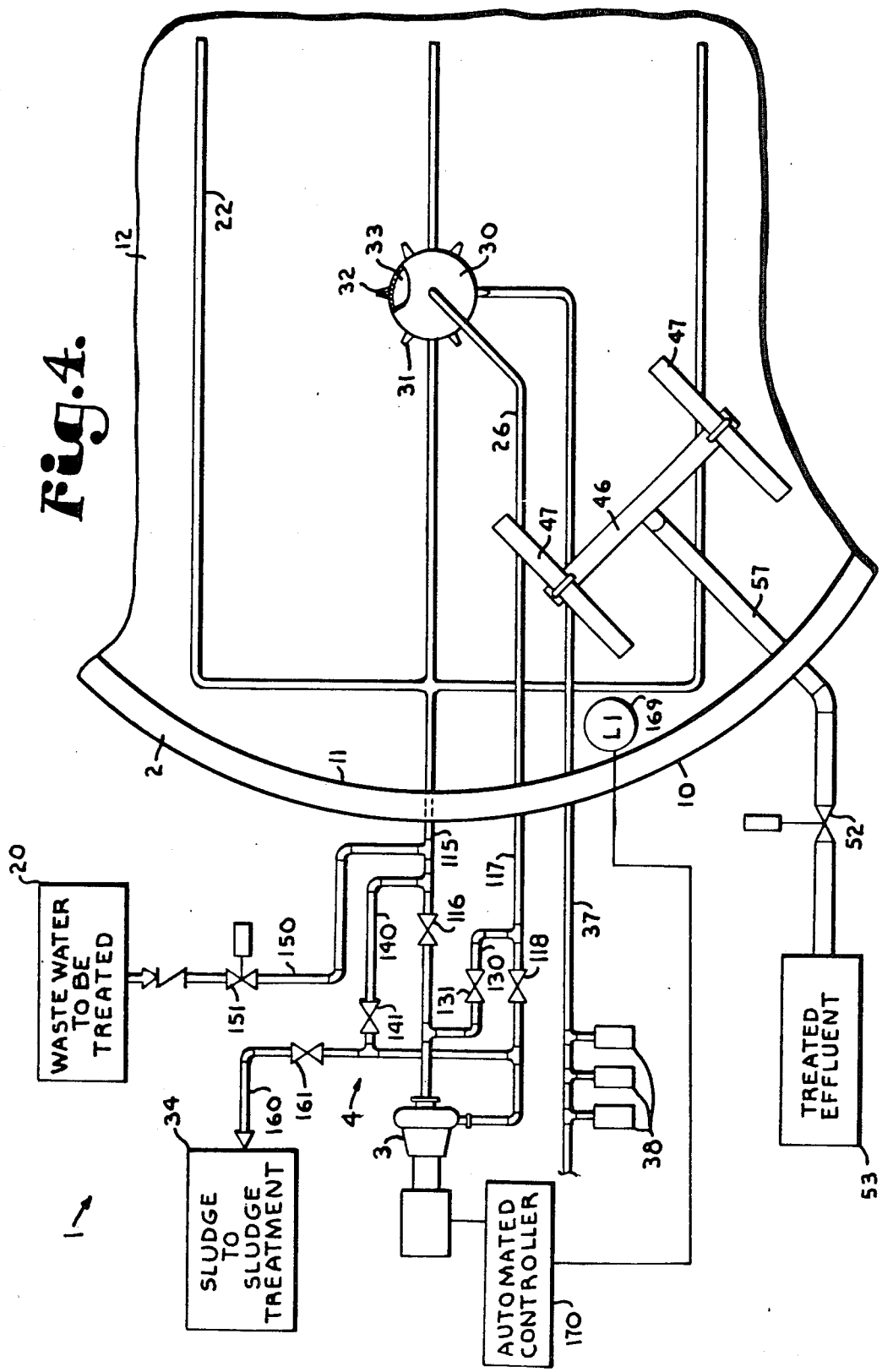
FIG. 4 is a further enlarged, partially schematic and fragmentary top plan view of the facility showing the piping and flow control system.

The manifold 4 is best shown in FIG. 4 which shows in detail the piping conduits and valving associated therewith. While the particular illustrated piping and valving layout shown in FIG. 4 has been found to be highly suitable for the present invention, it is foreseen that other piping layouts would satisfy the requirements of the invention. It is also foreseen that an interchangeable hose station or the like could be utilized as a replacement for some of the piping and valving where the system is to be operated manually or partially manually.

The manifold 4 includes a first conduit 115 which flow connects the downcomer 23 and distribution conduit 22 with the pump 3 on an opposite end thereof. A valve 116 is intermediately located along the conduit 115. A second conduit 117 connects the pump 3 with the distribution chamber 33 through the conduit 26. The conduit 117 also has a valve 118 intermediately located therealong. A third conduit 130 flow connects the first conduit 115 with the second conduit 117. The conduit 130 includes a valve 131 located therealong and connects with the first conduit intermediate the pump 3 and first valve 116. The conduit 130 connects with the second conduit 117 between the valve 118 and the distribution chamber 33. A fourth conduit 140 also connects the first conduit 115 with the second conduit 117 and has a valve 141 intermediately located therealong. The conduit 140 connects with the conduit 117 between the pump 3 and the valve 118. The conduit 140 also connects with the conduit 115 intermediate the valve 116 and the distribution conduit 22.

A fifth conduit 150 flow connects with the first conduit 115 intermediate the distribution conduit 22 and the valve 116. The fifth conduit has a flow control valve 151 located therealong and is joined with a source of wastewater to be treated, as indicated by the reference numeral 20 which must pass through the valve 151 to get to the conduit 115. A sixth conduit 160 flow connects with the conduit 117 and with a sludge disposal system generally indicated by the reference numeral 34. A control valve 161 is located along the conduit 160. The conduit 160 connects with the conduit 117 intermediate the pump 3 and valve 118.

The conduit 115 is connected with the inlet of the pump 3 and the conduit 117 is connected with the outlet of the pump 3.

A level indicator 169 is positioned in each reactor 2 near the bottom thereof and generates a signal representative of the position of the liquid level 15 within a respective reactor 2. The indicator 169 may be any suitable surface level monitoring device such as a bubbler, signal transducer or the like.

An automated controller, such as a process control computer, is generally indicated by the reference numeral 170 and is preferentially linked or connected to each of the valves within the facility 1 so as to allow automated control of the facility 1. Preferably the controller 170 is also linked to motors of each of the pumps 3 to the compressed air generators 38 and to the level indicator 169. In particular, the controller 170, as shown in FIG. 4, is linked to the pump 3 and to each of the valves 52, 118, 131, 116, 141, 151 and 161, as well as the indicator 169. Each of these just mentioned valves is preferably a suitable automatic control valve and is linked to the controller by conventional methods which may include transmission of signals from the controller 170 through control devices by means of electrical, pneumatic or other types of signals to each of the valves. The controller 170 receives a level indicating signal from the indicator 169.

In use, the reactor 2 is preferably a sequencing batch reactor and is typically partially prefilled with fluid to a level such as noted at 16 from previous usage and this includes a substantial amount of activated sludge remaining within the fluid 14. The controller 170 opens the valve 151 and additional wastewater to be treated is added to the reactor 2 through the conduits 115 and 22 to bring the fluid level up to the location noted by the reference numeral 15. (Alternatively, the incoming fluid may pass through the pump 3 and out the nozzles 31 with appropriate valving changes.)

Except as indicated below, the valves 131, 141, 161 and 52 are closed.

After influent is added and the reactor 2 is filled to the desired level or alternatively during filling, the valves 116 and 118 are normally open and the pump 3 is activated. At this time, fluid 14 from the reactor 2 and/or wastewater to be treated is drawn into the pump from the distribution channel 22 and/or from the conduit 150 and is expelled from the pump through the conduit 117 and consequently through the aeration distribution structure 30. In the aeration distribution structure 30, the fluid discharged by the pump 3 mixes with compressed air entering the distribution structure 30 from the conduit 37 and is discharged through the nozzle 31 and out the openings 32.

When the nozzles 31 become obstructed by material from the wastewater building up therein, the valves 116 and 118 are closed (valves 52 and 161 already being normally closed) and the valves 131 and 141 are opened and the pump 3 is operated. In this manner, fluid is drawn from the reactor 2 through the jet nozzles 32, through the conduit 117, through the conduit 130 and into the suction of the pump 3 after which it is expelled through a partial leg of the conduit 117 through the conduit 140 and consequently through a leg of the conduit 115 and the distribution channel 22.

After the fluid 14 within the reactor 2 is suitably treated by agitation and/or aeration, or the like, the pump 3 is stopped and the fluid 14 is allowed to settle such that sludge settles to the reactor bottom portion 28 and treated fluid rises to a top portion 175 of the reactor 2, such that the sludge is separated from the treated fluid. Consequently, a clarified liquid layer 110 remains at the top of the reactor 2 such as between the levels as indicated by the reference numerals 15 and 16. During agitation, the valve 52 is closed and clarified liquid 111 is allowed to stagnate within the support conduit 57 and receiver 46, see FIG. 5. As the differential pressure between the inside of the receiver 46 and the exterior thereof is approximately the same when the valve 52 is closed, the flap 87 closes or seals against the receiver 46, as seen in FIG. 5, so as to operably prevent fluid 110 inside the reactor 2 from entering the collection cavity 66 of the receiver 46.

When it is desired to drain the clarified fluid 111, the valve 52 is opened so that held clarified fluid 111 drains from the conduit 57 and the receiver 46. This produces a partial vacuum or lower pressure within the receiver 46 and a substantial differential pressure across the flap 87 between the interior and exterior of the receiver 46. The flap unattached end 91 then swings about the bend 94 up and away from the receiver 46 such that clarified fluid may flow beneath the flap 87 and through the cavity 96, thereafter through the port 65, and thereafter into the cavity 66 of the receiver 46 for eventual discharge through the conduit 57, valve 52 and effluent disposal 53. The valve 52 remains open until the clarified fluid 110 is drained to a desired level, after which the valve 52 is shut. At this time, the flap 87 reseals against the receiver 46 to prevent flow of additional clarified fluid 110 into the receiver cavity 66.

When sludge builds up at the bottom of the reactor to an undesirable level, part of the sludge is preferentially removed. At this time, the valves 116 and 161 are opened and the remaining valves 151, 141, 131, 118 and 52 are closed. The pump 3 is activated and sludge is drawn from the bottom portion 28 of the reactor 2 through the various apertures 25 and the distribution conduit 22 at spaced locations along and near the bottom of the reactor 2. This allows removal of relatively dense sludge, that is, the sludge with relatively high solids to water content. The sludge passes through the conduit 115 into the pump 3 and is discharged through a partial leg of conduit 117 into conduit 160 and passes on into the sludge disposal system generally indicated by the reference numeral 34. After pumping of sludge, the valve 161 is closed and the sequential batch process is ready to be repeated.

At high input wastewater flow rates, the influent distribution sludge conduit 22 will dissipate the velocity of the input wastewater across the bottom of the vessel 2 and thereby avoid interference with the separation and discharge of treated effluent, thus allowing the reactor to accomplish an expanded range of input flow rates without a concurrent decrease in effluent quality.

The reference numeral 201 generally designates a first modified wastewater treatment facility, which is shown in FIG. 6, in accordance with the invention for treatment of wastewater with microorganisms and through the process of aeration. The facility 201 includes a reactor 202, pumping means such as a recirculation pump 203 with an associated manifold 204 and a decanting apparatus 205.

The facility 201 is in many respects similar to the facility 1 of the previous embodiment and, therefore, the similar features will not be discussed in detail.

The reactors 202 comprise a cylindrical fluid containing tank, vessel or reservoir 210 having a side wall 211.

The reservoir 210 is adapted to hold wastewater fluid being treated therein in the same manner as reservoir 10 of the previous embodiment.

Wastewater to be treated enters through filling or inlet means such as the manifold 204 generally at the location indicated by the reference numeral 220 and is distributed along the bottom of the reactor 202 by means of an elongate trident-shaped distribution conduit or channel 222 flow connecting with and joined to the manifold 204. The conduit 222 has a plurality of spaced distribution outlets therealong, so that the outlets are positioned at a substantial number of different locations near the bottom of the reservoir 210. It is foreseen that the wastewater to be treated could enter the reactor 202 through means other than the manifold 204.

The distribution conduit 222 also flow connects with the pump 203 through the manifold 204 and the inlet means so as to distribute flow to the pump 203 or incoming wastewater to be treated near the bottom of the reservoir 210.

The pump 203 also is flow connected by the manifold 204 to a distribution structure 230. The distribution structure 230 has an interal chamber 233 connecting with a plurality of distribution nozzles 231. The nozzles 231 are internally shaped as a truncated cone and have discharge openings or apertures 232 therein having a cross-section smaller than the rest of such nozzle.

As will be discussed in greater detail later, piping and valving of the pump 203 may be selectively adjusted so that the pump 203 may draw from the distribution conduit 222 and discharge through the nozzles 231 or alternatively draw through the nozzles 231 for backflushing and cleaning of the nozzles 231, as desired. The manifold 204 associated with the pump 203 may also be flow configured as sludge removal means to discharge sludge drawn from the conduit 222 to a sludge collection location designated by the reference numeral 234, so that excess sludge may be withdrawn from the reactor 202.

A pressurized air manifold 237 is connected to a compressed air source, such as air compressors 238 and with the distribution structure 230. In this manner, compressed air can be selectively mixed with the wastewater fluid in the distribution structure 230 such that the wastewater exiting the nozzles 232 is highly oxygenated and may be moving at a relatively higher velocity to mix with and agitate fluid in the reactor 202.

Each decanting apparatus 205 comprises support means, such as supporting structure 245, a clarified liquid receiver 246, flotation means, such as floats 247, and a discharge conduit 257. The discharge conduit 257 sealably passes through an associated reactor wall 211 and empties into a municipal sewer, stream or the like, as indicated by the reference numeral 253 at the location noted as treated effluent under control of valve 252. The apparatus 205 is very similar in structure and function to the apparatus 5 of the previous embodiment.

The manifold 204 includes a first conduit 215 which flow connects the distribution conduit 222 with the pump 203 on an opposite end thereof. A valve 216 is intermediately located along the conduit 215. A second conduit 217 connects the pump 203 with the distribution chamber 233 through a conduit 226. The conduit 217 also has a valve 218 intermediately located therealong.

A third conduit 250 flow connects with the first conduit 215 intermediate the distribution conduit 222 and the valve 216. The third conduit 250 has a flow control valve 251 located therealong and is joined with the source of wastewater to be treated, as indicated by the reference numeral 220 which must pass through the valve 251 to get to the conduit 215. A fourth conduit 260 flow connects with the conduit 217 and with a sludge disposal system generally indicated by the reference numeral 234. A control valve 261 is located along the conduit 260. The conduit 260 flow connects with the conduit 217 intermediate the pump 203 and valve 218.

The conduit 215 is connected with the inlet of the pump 203 and the conduit 217 is connected with the outlet of the pump 203.

A level indicator 269 is positioned in the reactor 202 near the bottom thereof and generates a signal representative of the position of a liquid level within the reactor 202. The indicator 269 may be any suitable surface level monitoring device such as a bubbler, signal transducer or the like.

An automated controller, such as a process control computer, is generally indicated by the reference numeral 270 and is preferentially linked or connected to each of the valves within the facility 201 which are of the automatic control type, so as to allow automated control of the facility 201. Preferably the controller 270 is also linked to the motor of the pump 203, to the compressed air generators 238 and to the level indicator 269. In particular, the controller 270, as shown in FIG. 6, is linked to the pump 203 and to each of the valves 216, 218, 251, 252, and 261, as well as the indicator 269. Each of these just mentioned valves is preferably a suitable automatic control valve and is linked to the controller by conventional methods which may include transmission of signals from the controller 270 through control devices by means of electrical, pneumatic or other types of signals to each of the valves. The controller 270 receives a level indicating signal from the indicator 269.

The pump 203 is of a type which pumps in both a forward and reverse direction and preferably is a bi-directional propeller pump which reverses pumping direction by operation of a switch or the like which reverses the motor for the pump 203. Also preferably pumping directional control of the pump 203 is through the controller 270.

In use, the reactor 202 operates similar to the reactor 2 of the previous embodiment except for the following differences.

In the reactor 202, the direction of flow of fluid through the conduits 215 and 217 when valves 216 and 218 are open is controlled by the pumping direction of the pump 203. When the pump 203 is pumping forward, flow is drawn through the conduits 222 and 215 into the pump and exits through the conduit 217 and nozzles 231. When the pump 203 is reversed, the flow is reversed thereby backflushing the nozzles 231.

When the valve 216 is closed and the valve 251 is opened, wastewater from conduit 250 enters the reactor 202 through conduits 215 and 222. When the valves 251 and 218 are closed and the valves 216 and 261 are opened, sludge from the bottom of the reactor 202 can be withdrawn through conduits 222 and 215 by forward operation of the pump 203 and discharged through the conduits 217 and 260 into the sludge treatment area represented by the number 234.

Figure 7:
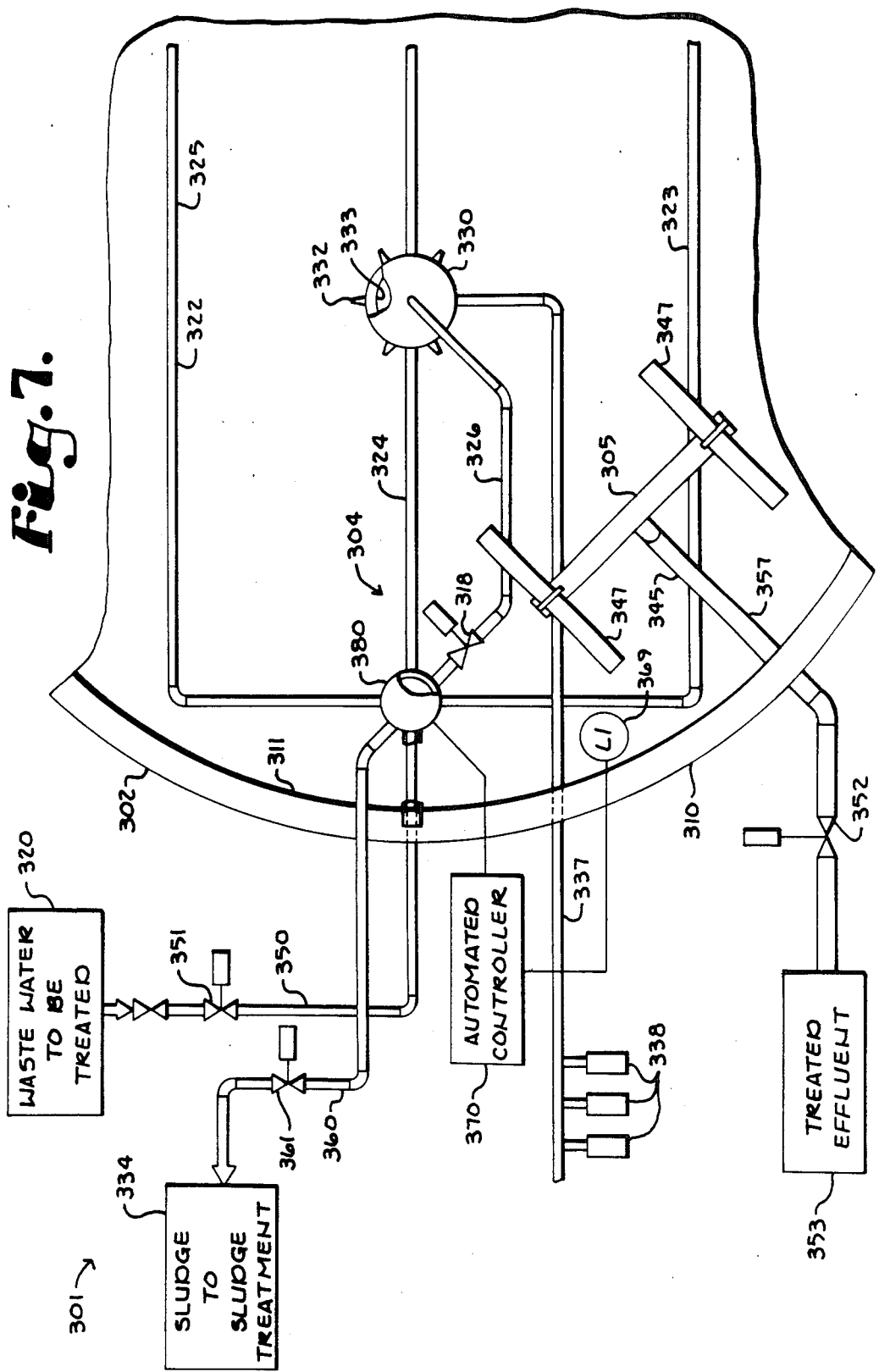
FIG. 7 is a partially schematic and fragmentary top plan view of a second modified facility showing a piping and flow control system thereof.

The reference numeral 301 generally designates a second modified wastewater treatment facility, which is shown in FIGS. 7, 8 and 9 and which is in accordance with the present invention for treatment of wastewater with microorganisms and through the process of aeration. The facility 301 includes a reactor 302, pumping means such as a recirculation pump 303 with an associated manifold 304 and a decanting apparatus 305.

The facility 301 is in many respects similar to the facilities 1 and 201 of the previous embodiments and, therefore, the similar features will not be discussed in detail.

The reactor 302 comprises a cylindrical fluid containing tank, vessel or reservoir 310 having a side wall 311 and a floor 312. The reservoir 310 is adapted to hold wastewater fluid being treated therein in the same manner as reservoirs 10 and 210 of the previous embodiments.

Wastewater to be treated enters through filling or inlet means such as the manifold 304 generally at the location indicated by the reference numeral 320 and is distributed along the bottom of the reactor 302 by means of an elongate trident-shaped distribution conduit or channel 322 having arms 323, 324 and 325 flow connecting with and joined to the manifold 304. The conduit 322 has a plurality of spaced distribution outlets 327 therealong, so that the outlets are positioned at a substantial number of different locations near the bottom of the reservoir 310. It is foreseen that the wastewater to be treated could enter the reactor 302 through means other than the manifold 304.

The distribution conduit 322 also flow connects with the pump 303 through the manifold 304 and the inlet means so as to allow flow from the reservoir 310 to the pump 303 or distribution of influent wastewater near the reservoir bottom 312.

The pump 303 also is flow connected by the manifold 304 to a distribution structure 330. The distribution structure 330 has an internal chamber 333 connecting with a plurality of distribution nozzles 331. The nozzles 331 are internally shaped as a truncated cone and have discharge openings or apertures 332 therein having a cross-section smaller than the rest of such nozzle.

As will be discussed in greater detail later, piping and valving of the pump 303 may be selectively adjusted so that the pump 303 may draw from the distribution conduit 322 and discharge through the nozzles 331 or alternatively draw through the nozzles 331 for backflushing and cleaning of the nozzles 331, as desired. The manifold 304 associated with the pump 303 may also be flow configured as sludge removal means to discharge sludge drawn from the conduit 322 to a sludge collection location designated by the reference numeral 334, so that excess sludge may be withdrawn from the reactor 302.

A pressurized air manifold 337 is flow connected to a compressed air source, such as air compressors 338 and with the distribution structure 330. In this manner, compressed air can be selectively mixed with the wastewater fluid in the distribution structure 330 such that the wastewater exiting the nozzles 332 is highly oxygenated and motivated to move at a relatively high velocity relative to surrounding fluid so as to mix agitate the fluid in the reactor 302.

Each decanting apparatus 305 comprises support means, such as supporting structure 345, a clarified liquid receiver 346, a flotation means, such as floats 347, and a discharge conduit 357. The discharge conduit 357 sealably passes through an associated reactor wall 311 and empties into a municipal sewer, stream or the like, as indicated by the reference numeral 353 at the location noted as treated effluent under control of valve 352. The apparatus 305 is very similar in structure and function to the apparati 5 and 205 of the previous embodiments.

The manifold 304 of the present embodiment includes a pump column 380. The pump column 380 comprises an outer shell 381 having an internal lower chamber 382 and an internal upper chamber 383 divided by the pump 303. The column 380 is intermediately sealed around the pump 303 by a wall 385 such that flow between the chambers 382 and 383 passes only through the pump 303. The column 380 has a top 386 and a bottom 387 sealing opposite ends thereof. The column 380 is generally vertically aligned and positioned interiorly of the reservoir 310 generally to extend from near the reservoir flow 312 to near or above a top 390 of the reservoir 310.

The column lower chamber 382 is flow connected with each of the channel arms 323, 324 and 325 so as to allow flow from the interior of the vessel 310 through the arms 323, 324 and 325 into the pump 303 and vice versa. A first conduit 350 flow connects the lower chamber 382 with the source of wastewater to be treated represented by the reference numeral 320 through a control valve 351 which is selectively operable to allow influent wastewater to pass into the lower chamber 382. A second conduit 326 flow connects the pump 303 through the upper chamber 383 with the distribution structure 330. Flow through the conduit 326 is controlled by a control valve 318.

A third conduit 360 flow connects between the column upper chamber 383 and a sludge disposal system generally indicated by the reference numeral 334. A control valve 361 is located along the conduit 360.

A level indicator 369 is positioned in the reactor 302 near the bottom thereof and generates a signal representative of the position of a liquid level within the reactor 302. The indicator 369 may be any suitable surface level monitoring device such as a bubbler, pressure transducer or the like.

An automated controller, such as a process control computer, is generally indicated by the reference numeral 370 and is preferentially linked or connected to each of the valves within the facility 301 which are of the automatic control type, so as to allow automated control of the facility 301. Preferably the controller 370 is also linked to the motor of the pump 303, to the compressed air generators 338 and to the level indicator 369. In particular, the controller 370, as shown in FIG. 7, is linked to the pump 303 and to each of the valves 318, 351 and 361, as well as the indicator 369. Each of these just mentioned valves is preferably a suitable automatic control valve and is linked to the controller by conventional methods which may include transmission of signals from the controller 370 through control devices by means of electrical, pneumatic or other types of signals to each of the valves. The controller 370 receives a level indicating signal from the indicator 369.

The pump 303 is submergible and pumps in both a forward and reverse direction. The pump 303 preferably is a bi-directional propeller pump which reverses pumping direction by operation of a switch or the like which reverses the motor for the pump 303. Also preferably, control of the direction of pumping of the pump 303 is through the controller 370.

In use, the reactor 302 operates similar to the reactors 2 and 202 of the previous embodiments except for the following differences.

All fluid flows of the reactor 302 pass through the column 380 except for decanted fluid passing through decanting apparatus 305 and only the conduit 350 passes through the wall 311 of the reactor 302. In particular, influent wastewater passes into the column chamber 382 through conduit 350 upon opening of valve 351. The influent may pass through the chamber 382 into the arms 323, 324 and 325 or, if the pump 303 is operating to direct flow upwardly, the influent is mixed with fluid from the reactor 302 and directed through conduit 324 and exits from the distribution structure 330, when the valve 318 is open. Fluid flow from the reactor 302 can also be directed from the conduit arms 323, 324 and 325 to the distribution structure 330 without influent wastewater, when the valve 318 is open, the valve 351 is closed and the pump 303 is pumping forward or in an upward direction, as shown in FIG. 8.

The valves 318 and 351 may be selectively closed and the valve 361, which is normally closed, may be opened to remove sludge from the reactor 302 by forward operation of the pump 303. Sludge removal is normally attempted only after the fluid in the reactor 302 has been quiescent for a substantial period to allow the sludge to settle and accumulate on the reactor bottom 312. The sludge is drawn through the openings 327 in the arms 323, 324 and 325 and directed by forward operation of the pump 303 through the conduit 360 with valve 361 open to the sludge treatment system represented by the numeral 334.

Both valve 361 and 351 can be closed and valve 318 opened at which time the pump 303 may operate forwardly and circulate fluid drawn in through arms 323, 324 and 325 through the pump 303 and out the distribution structure nozzles 332. Alternatively, the pump 303 may be reversed to draw fluid backwards through the nozzles 332 to backwash te nozzles 332 and discharge the backwash fluid through the arms 323, 324 and 325.

It is to be understood that while certain forms of the present invention have been illustrated and described herein, it is not to be limited to the specific forms or arrangement of parts described and shown.

What is claimed and desired to be secured by Letters Patent is as follows:

1. A wastewater treatment apparatus comprising means for treating wastewater by biological and chemical processes including mixing wastewater with air in an aeration mechanism and alternatively being able to reverse flow through said mechanism to backflush said mechanism; said apparatus including:
   (a) a reactor vessel having upper and lower portions and being adaptable for holding a wastewater fluid therein;
   (b) a piping system associated with said vessel;
   (c) bi-directional pumping means connected to said piping system;
   (d) said piping system including:
      (1) a pump column having a first chamber and an second chamber and having said pumping means positioned between said first and second chambers;
      (2) an untreated fluid distribution channel positioned in said vessel lower portion and flow connected to said column first chamber;
      (3) a wastewater inlet selectively flow connected to said vessel to allow untreated wastewater to enter said vessel; and
      (4) said aeration mechanism being adapted to utilize liquid mixed with air; said aeration mechanism being flow connected to said column second chamber so that, when said pumping means pumps in one direction, the fluid being treated is pumped through and out the aeration mechanism wherein the fluid is mixed with air and, when said pumping means pumps in an opposite direction, the fluid is pumped in a backflushing direction through said aeration mechanism to backflush said aeration mechanism; and (e) means for enabling alternatively: fluid to be withdrawn through said channel and circulated through said pump means to said aeration mechanism; and fluid to be withdrawn from said vessel through said aeration mechanism and circulated through said pump means so as to backflush said mechanism.

2. The apparatus according to claim 1 wherein:
(a) said pumping means includes a single bi-directional propeller pump; and including
(b) control means connected to said pump for automatically controlling the direction of fluid flow through said pump.

3. The apparatus according to claim 1 wherein:
(a) said column first chamber is a lower chamber and said second chamber is an upper chamber;
(b) said wastewater inlet is selectively flow connected with said column lower chamber;
(c) said distribution channel has a plurality of spaced distribution outlets in the vessel lower portion to allow dissipation of wastewater flow velocity over a substantial portion of said vessel lower portion; and
(d) said aeration mechanism comprises a compressed air-liquid jet with jet nozzles, such that fluid in said vessel is agitated during aeration.

4. The apparatus according to claim 3 including:
(a) a sludge disposal outlet selectively flow communicating with said column upper chamber; and
(b) said piping system having a modifiable configuration by manipulation of valving to allow said pumping means to withdraw sludge from said vessel lower portion through said distribution channel and to discharge the withdrawn sludge through said sludge disposal outlet.

5. The apparatus according to claim 4 wherein:
(a) said piping system includes flow control valves positioned between said column and each of said sludge disposal outlet, said wastewater inlet and said aeration mechanism; and including
(b) an automatic controller for modifying said flow control valves so as to allow for various alternative flow patterns through said piping system; and wherein
(c) said channel is valve free to allow substantially unrestricted flow of wastewater from said reservoir to said pumping means.

6. The apparatus according to claim 5 wherein:
(a) said automatic controller comprises an automatic process control computer; and
(b) a liquid level indicator communicating the level of liquid in said reactor to said computer.

7. The apparatus according to claim 1 including:
(a) decanting means positioned in said vessel upper portion and selectively communicating with a treated fluid outlet so as to allow removal of treated wastewater from said vessel.

8. The apparatus according to claim 1 wherein:
(a) said aeration mechanism comprises an air-liquid mixing chamber and has at least one jet nozzle communicating with said mixing chamber; said nozzle having an outlet of smaller cross-section than a remainder portion thereof; and
(b) a compressed air source flow connects with said chamber to allow air to be mixed with liquid in said mixing chamber to be discharged through said nozzle.

9. In a wastewater treatment reactor including means for treating a wastewater fluid by processes including aerating and/or agitating a fluid by flowing the fluid through an aertion device and wherein the aeration device is susceptable to blockage by debris contained in the wastewater fluid such that the aeration device must be periodically cleared of the debris; said reactor including a reaction vessel and said aeration device being positioned within said vessel; said aeration device being of a type wherein wastewater is withdrawn from said vessel, and injected back into said vessel for agitation or aeration; the improvement comprising:
(a) bi-directional pumping means;
(b) a piping system including a pump column; said column having first and second chambers separated by said pumping means; said column flow connecting said aeration device and fluid within said reaction vessel to said pumping means, such that when said pumping means pumps in one direction wastewater is drawn from said vessel and thereafter pumped through said aeration device and when said pumping means pumps in an opposite direction water is drawn or backflushed through said aeration device and discharged from said piping system into said vessel at a location spaced from said aeration device; and
(c) means for enabling said pumping means to be utilized both to aerate the water and to backflush said aeration device.

10. The reactor according to claim 9 wherein:
(a) said pumping means necessarily consists of a single bi-directional propeller type pumping unit mounted in said column such that flow between said first and second chambers passes through said pumping unit.

11. The reactor according to claim 10 wherein:
(a) said column first chamber is a lower chamber and connects said pumping unit directly with wastewater in said vessel through a first conduit and said column second chamber is an upper chamber and connects said pumping unit directly with said aeration device through a separate second conduit.

12. The reactor according to claim 11 wherein:
(a) said second conduit includes first valving means therealong; and including
(b) a third conduit flow connecting said column lower chamber with a source of influent wastewater and including second valving means therealong; and
(c) a fourth conduit flow connecting said column upper chamber with a sludge disposal system and including third valving means therealong.

13. A wastewater treatment apparatus comprising means designed for circulating wastewater through an agitation mechanism and alternatively backflushing said mechanism including:
(a) a reactor vessel having upper and lower portions and being adaptable for holding a wastewater fluid therein;
(b) a piping system associated with said vessel;
(c) bi-directional pumping means connected to said piping system:

(d) said piping system including: positioned in said vessel lower portion;
  (1) an untreated fluid distribution channel:
  (2) a pump column having first and second chambers with said pumping means positioned between said chambers; said distribution channel being flow connected with said first chamber;
  (3) a wastewater inlet selectively flow connected to said vessel to allow untreated wastewater to enter said vessel; and
  (4) said agitation mechanism selectively flow connected with said second chamber and discharging fluid therefrom when cooperatively connected to said pumping means pumping in a first direction and connected with a compressed air source such that fluid flows forward through said mechanism and is aerated; said agitation mechanism being flow connected to said pumping means such that when said pumping means pumps in the first forward direction fluid flows forward through said mechanism and when said pumping means pumps in a second reverse direction fluid is drawn backwards through said mechanism so as to backwash said mechanism; and
(e) means for enabling alternatively: untreated wastewater to be distributed in said vessel lower portion; fluid to be withdrawn through said channel and circulated through said manifold by said pump means to said agitation mechanism; and fluid to be withdrawn from said vessel through said agitation mechanism and circulated through said column by said pump means so as to backflush said mechanism.

14. The apparatus according to claim 13 wherein:
(a) said pumping means is a single bi-directional pump.

15. The apparatus according to claim 13 wherein:
(a) said wastewater inlet is selectively connected to said column first chamber; and including:
(b) a sludge outlet selectively connected to said column second chamber.

* * * * *